(12) United States Patent
Sturtevant et al.

(10) Patent No.: US 7,072,936 B2
(45) Date of Patent: Jul. 4, 2006

(54) SYSTEM AND METHOD FOR AGGREGATING DATA HAVING DATA AND APPLICATION DEPENDENCIES

(75) Inventors: Joseph C. Sturtevant, Cos Cob, CT (US); Suhrud I. Dagli, Stamford, CT (US)

(73) Assignee: RiskSpan, Inc., Stamford, CT (US)

( * ) Notice: Subject to any disclaimer, the term of this patent is extended or adjusted under 35 U.S.C. 154(b) by 958 days.

(21) Appl. No.: 10/020,259

(22) Filed: Dec. 13, 2001

(65) Prior Publication Data

US 2002/0133541 A1    Sep. 19, 2002

Related U.S. Application Data

(60) Provisional application No. 60/256,133, filed on Dec. 13, 2000.

(51) Int. Cl.
  *G06F 15/16*  (2006.01)
  *G06F 9/00*   (2006.01)

(52) U.S. Cl. .................. 709/203; 718/106; 718/107

(58) Field of Classification Search ........... 709/203, 709/248; 707/100, 203, 103 R, 10; 719/317; 718/1, 106, 107; 705/35, 36 R
See application file for complete search history.

(56) References Cited

U.S. PATENT DOCUMENTS

| | | | | |
|---|---|---|---|---|
| 5,577,240 A | * | 11/1996 | Demers et al. | 707/8 |
| 6,115,710 A | * | 9/2000 | White | 707/10 |
| 6,442,554 B1 | * | 8/2002 | Reddy et al. | 707/100 |
| 6,615,253 B1 | * | 9/2003 | Bowman-Amuah | 709/219 |
| 6,948,172 B1 | * | 9/2005 | D'Souza | 718/106 |
| 6,978,279 B1 | * | 12/2005 | Lomet et al. | 707/202 |

OTHER PUBLICATIONS

A proff procedure for data dependencies, (JACM), vol. 31, issue 4 (Oct. 1984), pp. 718-741, by Catriel Beeri and Moshe Y. Vardi.*

* cited by examiner

*Primary Examiner*—Frantz B. Jean
(74) *Attorney, Agent, or Firm*—Aaron Wininger; Squire, Sanders & Dempsey L.L.P.

(57) ABSTRACT

A system for aggregating data having data and application dependencies. The system includes a set of the applications, the set including independent and dependent applications; and an aggregation client, communicatively coupled to the set of applications and to an aggregation server, the aggregation client capable to map dependencies of the set of applications, request and receive data for updating the independent applications, and update dependent applications when independent applications that are depended on are updated with received data.

31 Claims, 5 Drawing Sheets

SYSTEM AND METHOD FOR AGGREGATING DATA HAVING DATA AND APPLICATION DEPENDENCIES

PRIORITY REFERENCE TO PRIOR APPLICATIONS

This application claims benefit of and incorporates by reference patent application Ser. No. 60/256,133, entitled "Newbreak Platform-Independent Aggregation Enabling Architecture With Application And Data Dependencies For A Custom Functional Flow," filed on Dec. 13, 2000, by inventors Suhrud I. Dagli and Joseph C. Sturtevant.

TECHNICAL FIELD

This invention relates generally to aggregating data, and more particularly, but not exclusively, provides a system and method for aggregating data having data and application dependencies.

BACKGROUND

Conventionally, to view data from a variety of sources, such as websites, local applications, external applications, trading exchanges, etc., a user must access a plurality of interfaces, which can be complicated and time consuming. Further, to generate a customized solution, data from one interface may need to be integrated into a second interface, often via manual intervention, which can be very inconvenient.

Accordingly, a new system and method for aggregating data with application and data dependencies may be needed.

SUMMARY

The present invention provides a system for aggregating data with application and data dependencies. The system comprises an aggregator system communicatively coupled to a client system. The aggregator system can also be communicatively coupled to external data and application sources, such as web services, web sites, trading exchange feeds, market data feeds from external sources, external databases, specific applications and spreadsheets from computers within a client's local network.

The client system comprises a client browser, an aggregation client, and a screen manager client. The client system may also comprise at least one local application and local data. The aggregation client communicates with the screen manager client and local and external sources for integrating data and applications. Specifically, the aggregation client receives subscription requests from the screen manager client; creates a persistent HTTP connection with the aggregator system for all independent subscriptions; maintains the connection with the aggregator system and reestablishes the connection if it is terminated; communicates new subscription requests to the aggregator system; creates subscription links for all local services; and communicate with the screen manager client to update application windows on receipt of updates from subscriptions. In addition, the aggregation client further maintains a map of all dependent subscriptions to applications to enable updating of data when dependent data changes.

The aggregator system comprises a server engine and a request processor engine. The server engine is capable to aggregate data from a plurality of external sources, interfaces and program output. The server engine forwards aggregated data to the client system upon receipt of a command from the client system via the request processor engine.

The present invention further provides a method for aggregating data with application and data dependencies. The method comprises selecting or creating an application; registering the application with screen manager client; registering the application with the aggregation client; registering with appropriate sources to receive data for the registered application; receiving data from the sources; determining if any of the registered applications is dependent on the received data or dependent on data generated by an application based on the received data; if an application is dependent, forwarding the required data (either received or generated by another application) to the application for processing; and displaying updated data comprising the received data and/or generated data and/or processed data from a dependent application.

The system and method may advantageously enable the aggregation of data having data and/or application dependencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person skilled in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
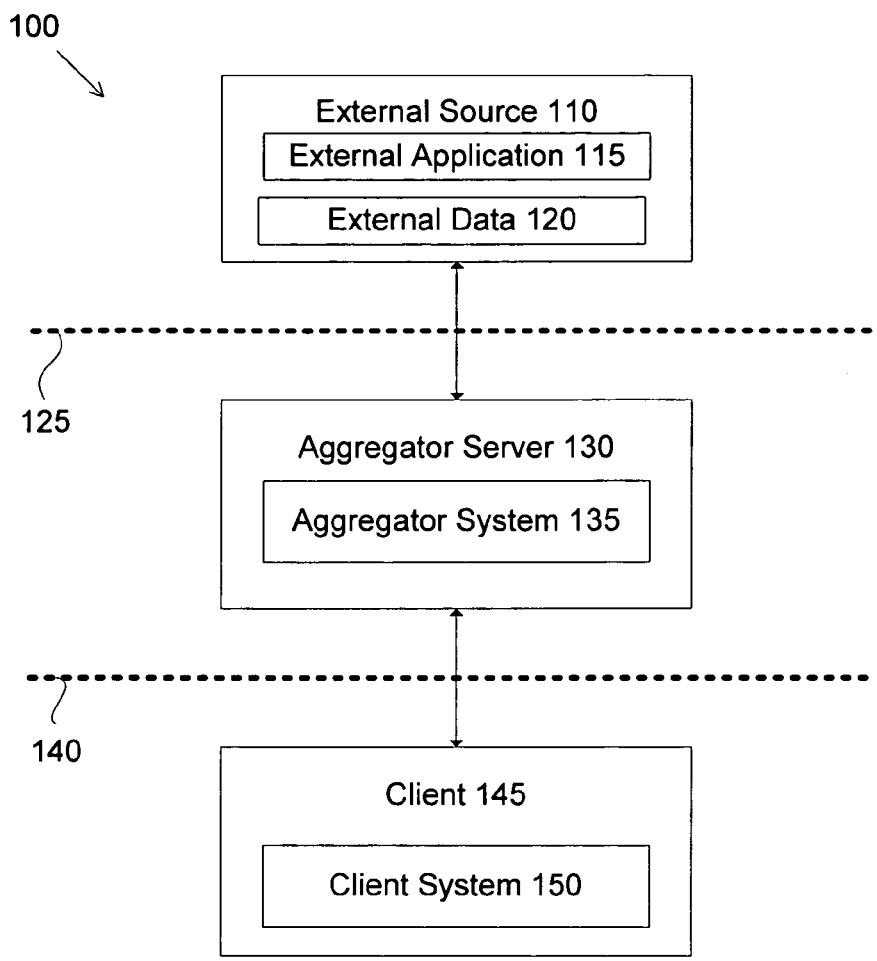
FIG. 1 is a block diagram illustrating a network system for aggregating data having application and/or data dependencies in accordance with an embodiment of the invention.

FIG. 1 is a block diagram illustrating a network system 100 for aggregating data having application and/or data dependencies in accordance with an embodiment of the invention. System 100 comprises an aggregator server 130, a client 145 communicatively coupled to the server 130, and an external source 110 communicatively coupled to the server 130. For security reasons, system 100 may also include a first firewall 125 between the server 130 and the external source 110 and a second firewall 140 between server 130 and client 145. In another embodiment of the invention, additional servers or other sources of data and/or applications may be communicatively coupled to the server 130.

In another embodiment of the invention, network system 100 may further comprise a mobile device (not shown), such as a laptop or handheld computer, communicatively coupled to the server 130. The mobile device may also include a client system so as to enable aggregation from multiple sources that may have data and/or application dependencies.

In another embodiment of the invention, network system 100 may further comprise one or more external clients (not shown) communicatively coupled to server 130. The external client may comprise a client system similar to client system 150 and can update data stored in client system 150.

Aggregator server 130 comprises an aggregator system 135 for aggregating data and applications from external source 110 and/or other sources (not shown) for transmission to client 145. System 135 will be discussed in further detail in conjunction with FIG. 3. Client 145 comprises client system 150 for aggregating data and applications from system 135 and for presenting the data in application windows to a user for viewing. System 150 will be discussed in further detail in conjunction with FIG. 4. External source 110 may comprises an external application 115 for processing data and external data 120. External source 110 may include a proprietary model, trading exchange or any other type and source of applications and/or data.

Figure 2:
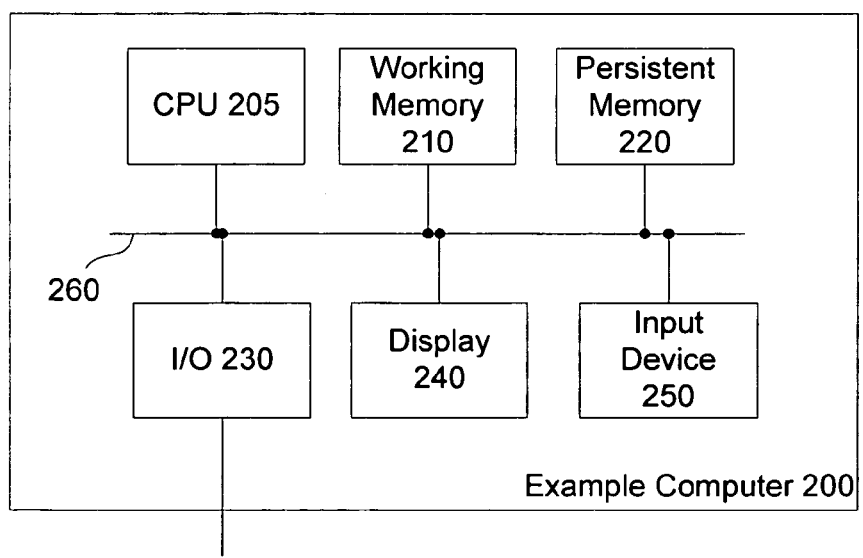
FIG. 2 is a block diagram illustrating an example computer system.

FIG. 2 is a block diagram illustrating an example computer in accordance with the present invention. In an embodiment of the invention, client 145, aggregator server 130, and external source 110 may include or be resident on example computer 200. The example computer 200 includes a central processing unit (CPU) 205; working memory 210; persistent memory 220; input/output (I/O) interface 230; display 240 and input device 250, all communicatively coupled to each other via system bus 260. CPU 205 may include an Intel Pentium® microprocessor, a Motorola Power PC® microprocessor, or any other processor capable to execute software stored in persistent memory 220. Working memory 210 may include random access memory (RAM) or any other type of read/write memory devices or combination of memory devices. Persistent memory 220 may include a hard drive, read only memory (ROM) or any other type of memory device or combination of memory devices that can retain data after example computer 200 is shut off. I/O interface 230 is communicatively coupled, via wired or wireless techniques, to a network for communicating with other computers. In an alternative embodiment of the invention, I/O 230 may be directly communicatively coupled to a server or computer. Display 240 may include a cathode ray tube display or other display device. Input device 250 may include a keyboard, mouse, or other device for inputting data, or a combination of devices for inputting data.

One skilled in the art will recognize that the example computer 200 may also include additional devices, such as network connections, additional memory, additional processors, LANs, input/output lines for transferring information across a hardware channel, the Internet or an intranet, etc. One skilled in the art will also recognize that the programs and data may be received by and stored in the computer 200 in alternative ways.

Figure 3:
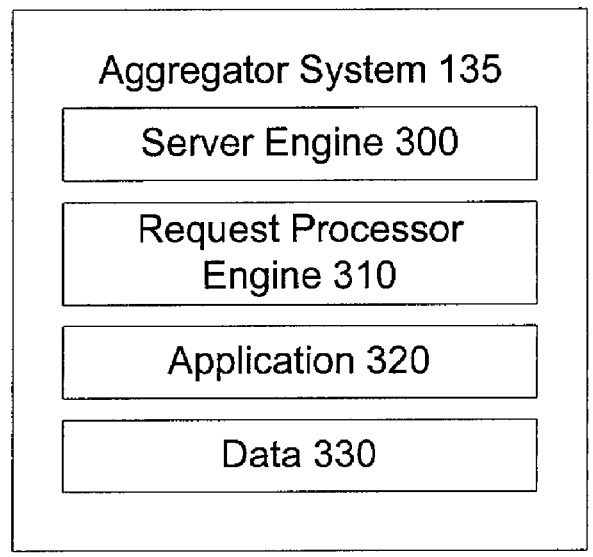
FIG. 3 is a block diagram illustrating the aggregator system of the aggregator server of FIG. 1.

FIG. 3 is a block diagram illustrating the aggregator system 135 of the aggregator server 130 (FIG. 1). System 135 comprises a server engine 300, a request processor engine 310, an application 320 and data 330. System 135 components, such as engine 310, may be implemented with software, integrated circuits, digital signal processors and/or other devices. In an embodiment of the invention, the system 135 may further comprise additional or fewer applications and/or no data 330. Server engine 300 maintains a persistent HTTP connection (port 80) with the client system 150 and receives data from external sources such as external source 110 and from local sources such as application 320 and data 330. External sources can include proprietary models, back office, legacy systems, spreadsheets, vendor models, trading exchanges, the Internet, manual input, and other sources. Via the persistent connection, the server engine 300 can send the received data to the client system 150. All data sent to client system 150 may be encrypted to enable high security use. Engine 310 receives requests for data from client system 150 and instructs server engine 300 to transmit the requested data to client system 150. Application 320 resides in aggregation system 135 and generates data for display on client 145. Examples of functions of application 320 include mortgage rate calculations, news aggregation, bond price calculations, etc.

Figure 4:
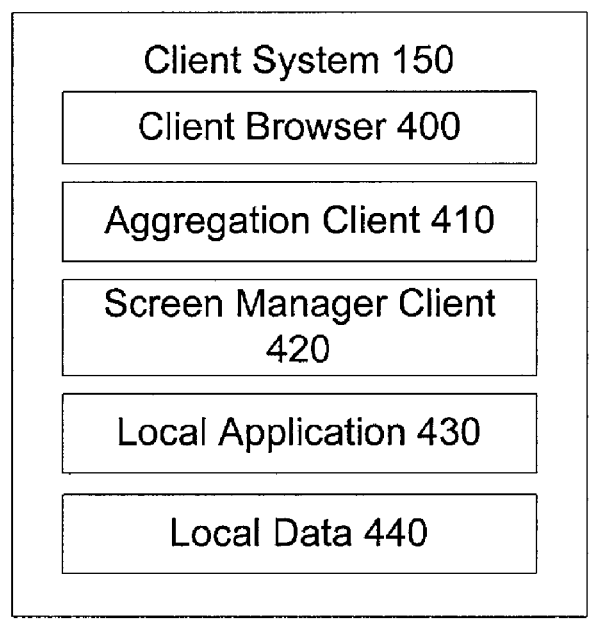
FIG. 4 is a block diagram illustrating the client system of the client of FIG. 1.

FIG. 4 is a block diagram illustrating the client system 150 of the client 145 (FIG. 1). Client system 150 comprises a client browser 400, an aggregation client 410, a screen manager client 420. In addition, client system 150 may further comprise a local application 430 and local data 440. System 150 components, such as aggregation client 410, may be implemented with software, integrated circuits, digital signal processors and/or other devices. Client browser 400 may include an Internet web browser such as Internet Explorer or Netscape Navigator®.

Browser 400 can display data generated by applications and/or from subscriptions in application windows. Application windows will be discussed in further detail in conjunction with FIG. 6.

Aggregation client 410 communicates with screen manager client 420 and local and external services or subscriptions for data aggregation.

Client 410 receives application subscription requests from the screen manager client 420; creates a persistent HTTP connection with the server 130; maintains the connection and reinitiates the connect in case of severance; communicates with the request processor engine 310 to inform the server engine 300 of any new application subscription requests or changes in existing subscriptions; creates application subscriptions links with local applications; communicates with the screen manager client 420 to update application windows displaying data upon receiving updates from subscriptions; maintains a map of all dependent applications; and receives updates for all independently updating applications from a local source and/or from server 130.

Screen manager client 420 manages application windows on browser 400. Specifically, the client 420 can create application windows; subscribe to update procedures for applications via the aggregation client 410; interface with the aggregation client 410 for manual updates; apply updates to application windows; maintain a list of all application windows, their corresponding application subscriptions and dependencies; maintain layout information for the application windows; provide screen management functions to freeze layout and lock window positions. Further, in an embodiment of the invention, a user can change layout and window positions.

Local application 430 may generate data based on received data or local data from a subscription, may display received data from a source without modification or may generate data based on data generated from a second application (not shown) for display via browser 400. For example, application 430 generated data may be dependent on received data or data generated by another application. Local data 440 may include data generated by application 430 and/or may be any other data stored locally.

Figure 5A:
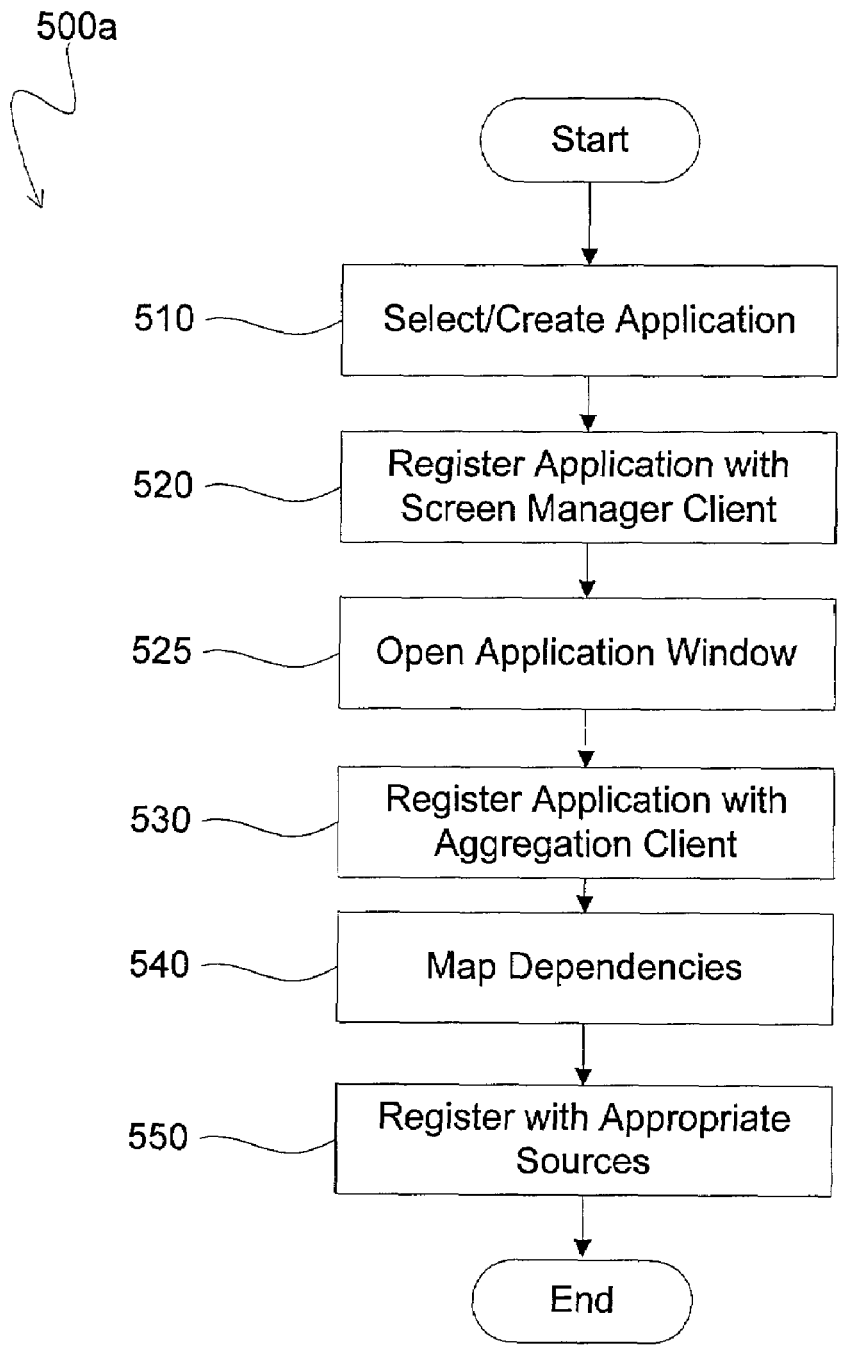
FIG. 5A and FIG. 5B are flowcharts illustrating a method for aggregating data having data and/or application dependencies.
Figure 5B:
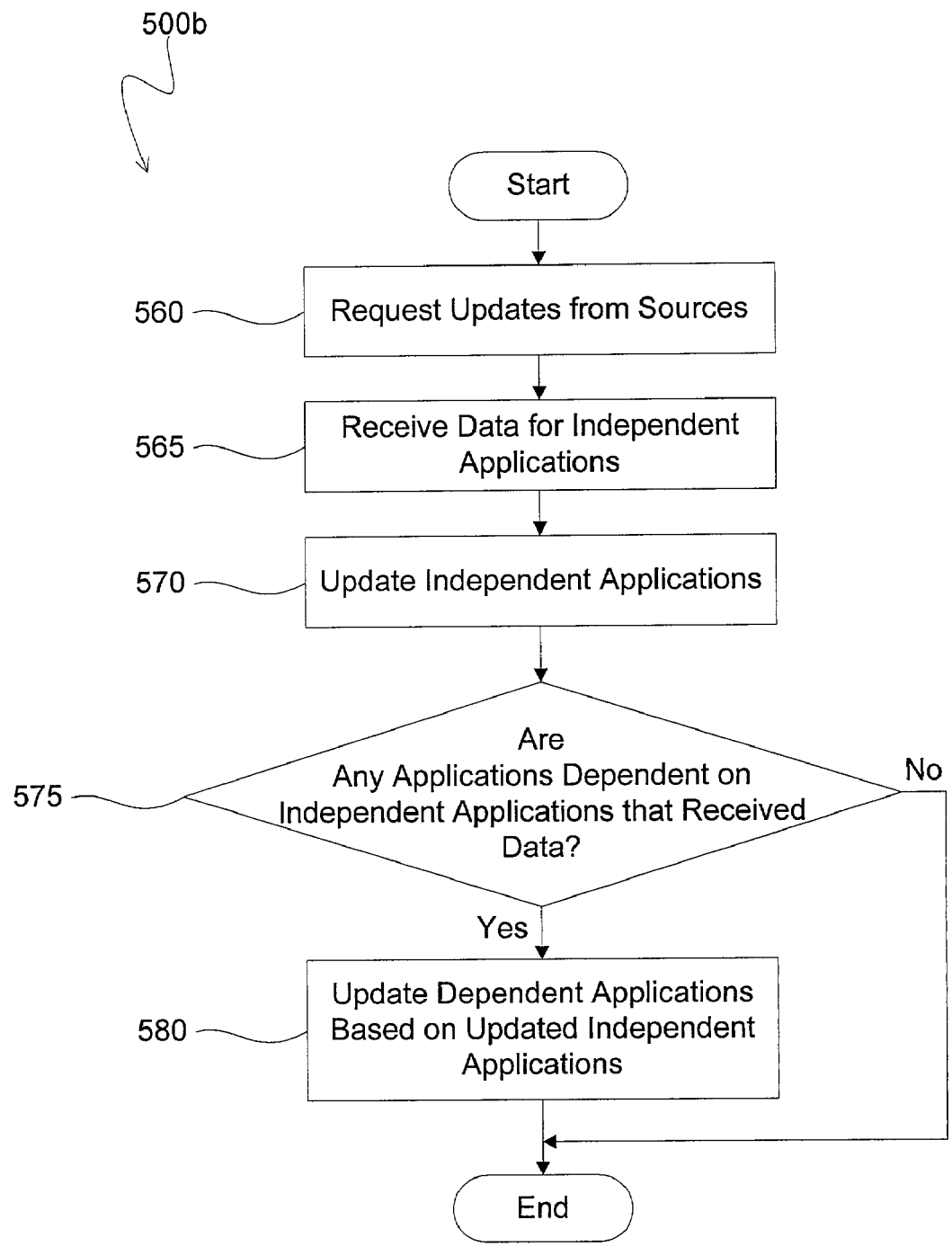

FIG. 5A and 5B are flowcharts illustrating a methods 500*a* and 500*b* for aggregating data having data and/or application dependencies. In an embodiment of the invention, multiple instances of methods 500*a* and/or 500*b* may run simultaneously. In method 500*a*, an application is first selected or created (510) and then run. The application can be a local application, such as application 430, an application on server 130, such as application 320, or an application located on an external source, such as application 115 on external source 110. If the selected application is not available locally (e.g., not local application 430), the selected application can be downloaded to client 145 and then run.

The selected or created application is then registered (520) with the screen manager client 420 so that client 420, in conjunction with browser 400, can open (525) an application window for displaying application output data.

Next, the application is registered (530) with the aggregation client 410, which then maps (540) the registered application's dependencies, if any, to other applications or data. Sources required by the registered application are then registered (550) with so that the sources can provide data to applications on client system 150. Sources of data may include JAVA applications, JAVA servlets, Excel spreadsheets, Corba services, TCP/IP, DLLs, databases, legacy applications, text/ASCII files, XML documents, other applications, etc. The sources may be local, such as local data 440, or external, such as data 330 on server 130 or external data 120 on external source 110. The method then ends.

In method 500*b*, updates are requested (560) from sources, either from local sources or other sources via aggregator system 135 by sending a request to request processor engine 310. Other sources may include aggregator system 135 data and applications, external data and applications, and user exported applications and data. Request for updates may be initiated for different applications at different rates. In addition, requests for updates may be initiated at regularly scheduled intervals or at intervals specified by the applications.

Next, data is received (565) for independent applications, i.e., applications having no dependencies. The applications then are updated (570) with the received data and application windows corresponding to the applications are updated. It is then determined (575) if any applications not updated are dependent on the updated applications. The aggregation client 410 can make this determination using the dependency map previously generated (540, FIG. 5A). If no applications are dependent, the method 500*b* ends. Otherwise, the dependent applications are updated (580) using data generated or received by the independent applications. Screen manager client 420 can then display output from the dependent applications in corresponding application windows. The method 500*b* then ends.

Figure 6:
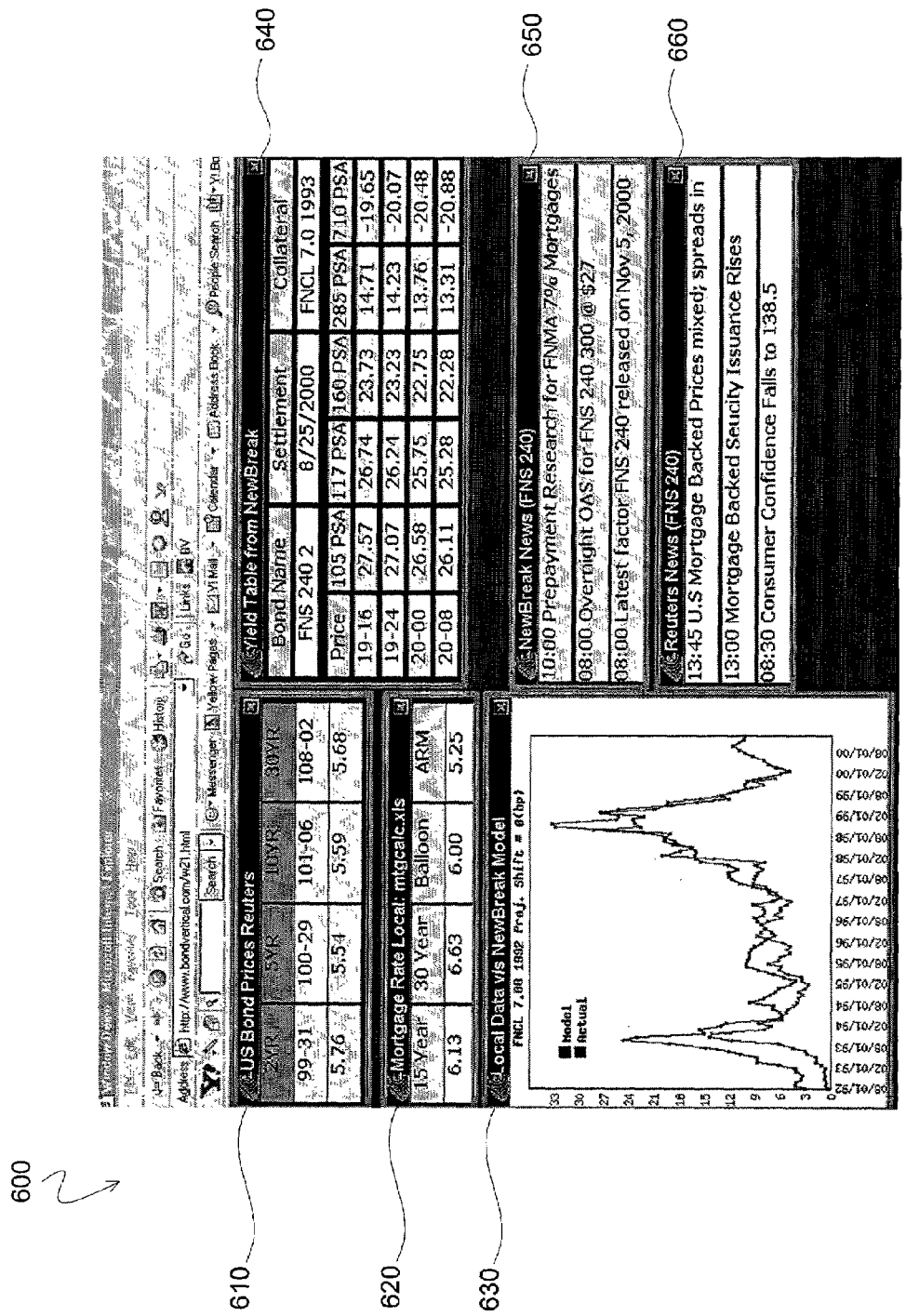
FIG. 6 is a diagram illustrating an example screen produced by a screen manager client of the client system of FIG. 4.

FIG. 6 is a diagram illustrating an example screen 600 produced by screen manager client 420 of the client system 150 (FIG. 4). Screen 600 comprises six application windows corresponding to six applications. Application window 610 list bond prices from data feeds hosted on aggregator server 130. Application window 620 lists mortgage rates generated by an Excel spreadsheet. The mortgage rates are dependent on bond prices from application window 610. Accordingly, mortgage rates in window 620 are not updated until bond prices in window 610 are updated.

Application window 630 contains a chart generated by an application on aggregator server 130 using data obtained from a local database and server 130 models. Application window 640 lists yields for derivative bonds generated by an application on server 130. The yields are dependent on bond prices from application window 610 and a local DLL stored on client 145. Accordingly, the yields are not updated until updated data is received for application window 610. Application windows 650 and 660 include news from news feeds hosted on server 130. The application(s) that generated windows 650 and 660 use data from application window 610 as a search term. Accordingly, the application corresponding to windows 650 and 660 is dependent on data from the application that generates window 610.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
   mapping dependencies of a set of applications, the set of applications including independent applications and dependent applications;
   receiving data for the at least one of the independent applications;
   updating the at least one independent application using the received data;
   determining if any of the dependent applications are dependent on the at least one independent application; and
   updating dependent applications determined to be dependent on the at least one independent application.

2. The method of claim 1, further comprising displaying updated data in application windows corresponding to updated applications.

3. The method of claim 1, wherein at least one of the applications from the set of applications resides on a local client.

4. The method of claim 1, wherein at least one of the applications from the set of applications resides on a server.

5. The method of claim 1, wherein at least one of the applications from the set of applications resides on an external source.

6. The method of claim 1, wherein updating the at least one independent application is done on a regularly scheduled basis.

7. The method of claim 1, wherein updating the at least one independent application is done at intervals specified by the at least one independent application.

8. The method of claim 1, wherein the receiving receives data from a server.

9. The method of claim 8, wherein the server receives data from an external source.

10. The method of claim 1, wherein the received data in encrypted and further comprising decrypting the received data.

11. A computer-readable medium having stored thereon instructions to cause a computer to aggregate data having dependencies, the instructions comprising:
  map dependencies of a set of applications, the set of applications including independent applications and dependent applications;
  receive data for the at least one of the independent applications;
  update the at least one independent application using the received data;
  determine if any of the dependent applications are dependent on the at least one independent application; and
  update dependent applications determined to be dependent on the at least one independent application.

12. The computer-readable medium of claim 11, further comprising an instruction to display updated data in application windows corresponding to updated applications.

13. The computer-readable medium of claim 11, wherein at least one of the applications from the set of applications resides on a local client.

14. The computer-readable medium of claim 11, wherein at least one of the applications from the set of applications resides on a server.

15. The computer-readable medium of claim 11, wherein at least one of the applications from the set of applications resides on an external source.

16. The computer-readable medium of claim 11, wherein updating the at least one independent application is done on a regularly scheduled basis.

17. The computer-readable medium of claim 11, wherein updating the at least one independent application is done at intervals specified by the at least one independent application.

18. The computer-readable medium of claim 11, wherein the instruction to receive receives data from a server.

19. The computer-readable medium of claim 18, wherein the server receives data from an external source.

20. The computer-readable medium of claim 11, wherein the received data in encrypted and the computer-readable medium further comprises an instruction to decrypt the received data.

21. A system, comprising:
  means for mapping dependencies of a set of applications, the set of applications including independent applications and dependent applications;
  means for receiving data for the at least one of the independent applications;
  means for updating the at least one independent application using the received data;
  means for determining if any of the dependent applications are dependent on the at least one independent application; and
  means for updating dependent applications determined to be dependent on the at least one independent application.

22. A system, comprising:
  a set of the applications, the set including independent and dependent applications; and
  an aggregation client, communicatively coupled to the set of applications and to an aggregation server, the aggregation client capable to map dependencies of the set of applications, request and receive data for updating the independent applications, and update dependent applications when independent applications that are depended on are updated with received data.

23. The system of claim 22, further comprising a screen manager client capable to display data in application windows corresponding to the set of applications.

24. The system of claim 22, wherein at least one of the applications from the set of applications resides initially on the system.

25. The system of claim 22, wherein at least one of the applications from the set of applications initially resides on the server.

26. The system of claim 22, wherein at least one of the applications from the set of applications initially resides on an external source.

27. The system of claim 22, wherein the aggregation client is further capable to update the independent applications on a regularly scheduled basis.

28. The system of claim 22, wherein the aggregation client is further capable to update the independent applications at intervals specified by the independent applications.

29. The system of claim 22, wherein the aggregation client is further capable to receive data from the server.

30. The system of claim 29, wherein the server receives data from an external source.

31. The system of claim 22, wherein aggregation client is further capable to receive encrypted data from the server and to decrypt the encrypted data.

* * * * *